May 26, 1970          G. BUCHMAN          3,514,172
LOCKING DEVICE FOR PORTABLE EQUIPMENT
Original Filed April 24, 1967          3 Sheets-Sheet 1
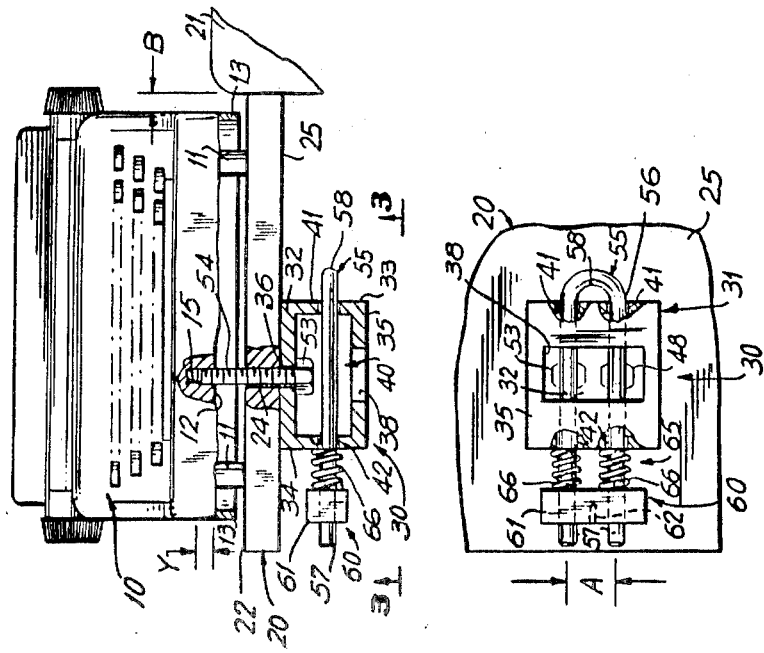
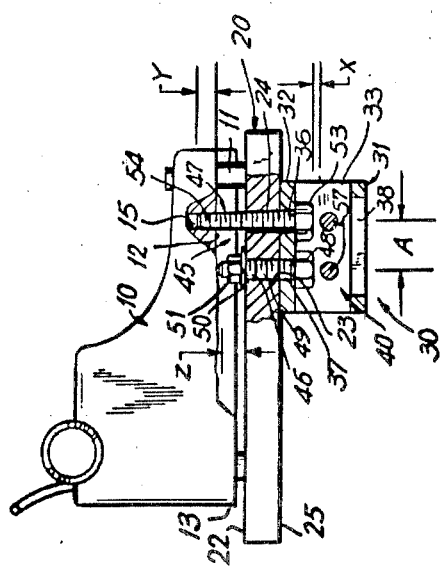
INVENTOR.
GERALD BUCHMAN
BY
*Leonard W. Suroff*
ATTORNEY

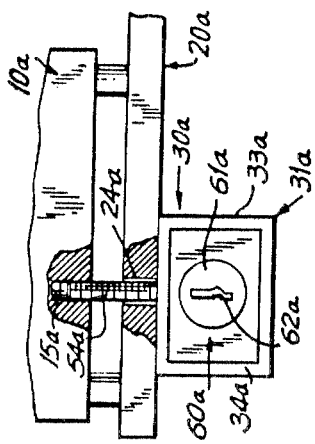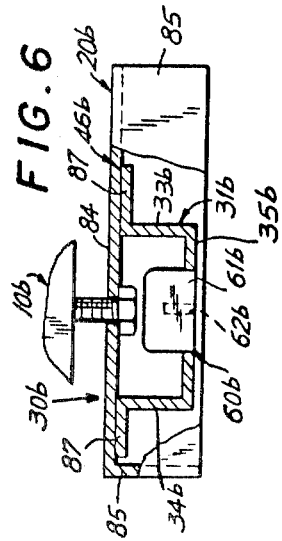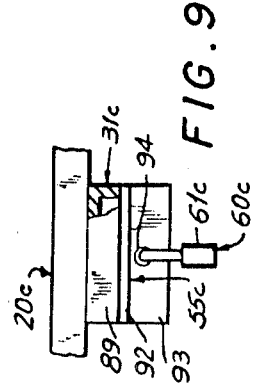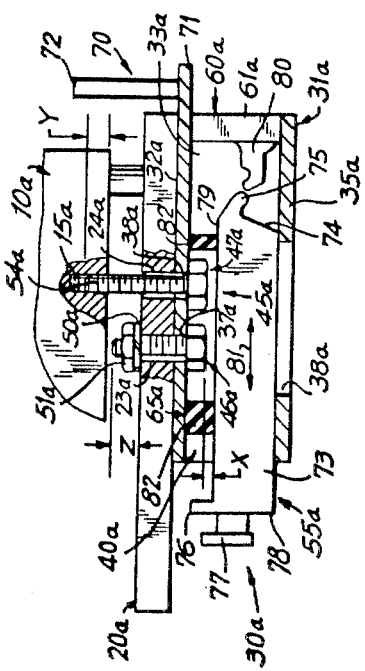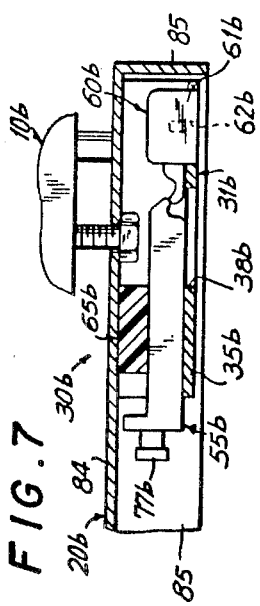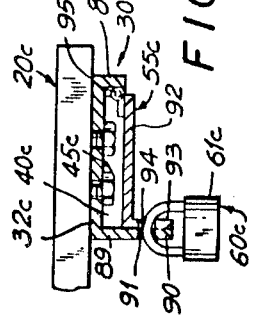

May 26, 1970    G. BUCHMAN    3,514,172
LOCKING DEVICE FOR PORTABLE EQUIPMENT
Original Filed April 24, 1967    3 Sheets-Sheet 3
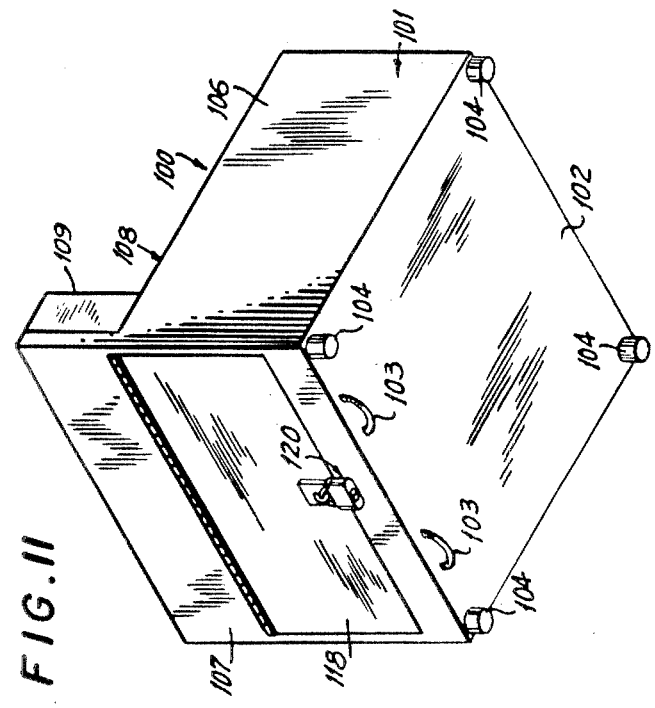
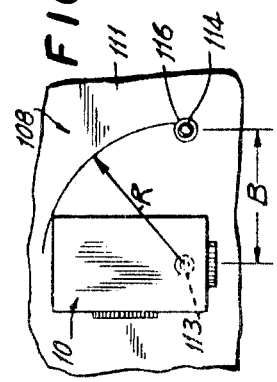
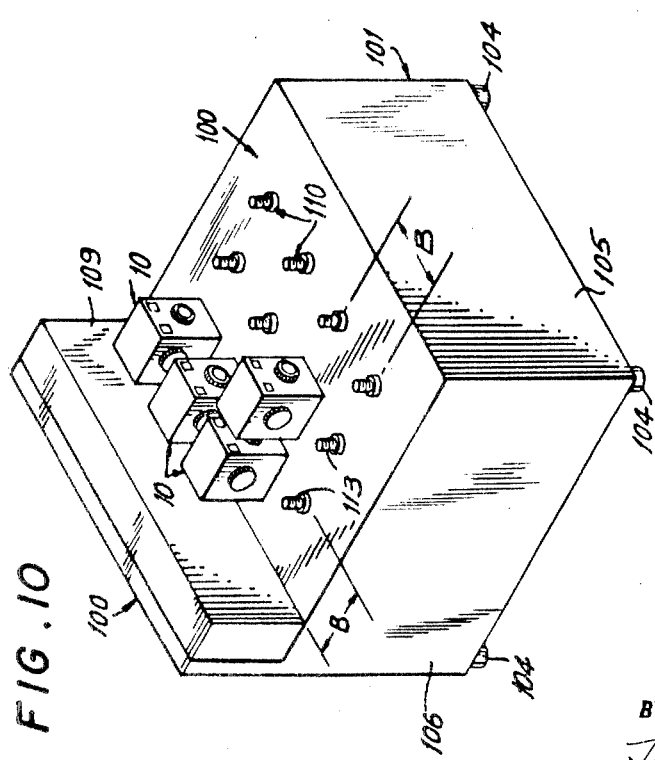
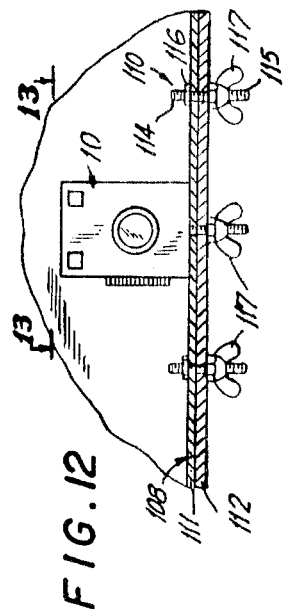
INVENTOR.
GERALD BUCHMAN
BY
Leonard W. Suroff
ATTORNEY – # United States Patent Office 3,514,172
Patented May 26, 1970

3,514,172
LOCKING DEVICE FOR PORTABLE EQUIPMENT
Gerald Buchman, 2821 W. 12th St.,
Brooklyn, N.Y. 11223
Original application Apr. 24, 1967, Ser. No. 633,028,
Divided and this application Oct. 22, 1968, Ser.
No. 769,632
Int. Cl. E05b 73/00, 65/44; F16b 41/00
U.S. Cl. 312—215      11 Claims

ABSTRACT OF THE DISCLOSURE

To prevent the theft of portable equipment such as typewriters and cameras by a locking device that is easily attachable to portable equipment and in particular the desk or other surface on which the equipment normally rests. The locking device is operated by a key that is required for the removal of the portable equipment. A display cabinet on which cameras are positioned and locked in place in a manner in which they cannot be removed by rotating them, but at the same time are open to inspection, is also provided for.

CROSS-REFERENCE TO RELATED APPLICATION

This is a division of application Ser. No. 633,028, now Pat. No. 3,434,312, filed Apr. 24, 1967.

BACKGROUND OF THE INVENTION

This invention relates to a locking device for preventing attempts at the unauthorized removal of normally portable equipment from a desired location. More in particular this invention relates to devices which are readily attachable to the existing portable equipment such as office equipment in the form of typewriters, adding machines, reproduction machines and any other portable equipment found in the office. The locking device claimed in this invention may be also used to secure cameras, projectors, etc. on display in stores to permit potential customers to view them without being able to remove them.

The theft of portable equipment from offices, such as typewriters, has increased in recent years as has other crimes. One reason contributing to the theft in many office buildings is the conversion to automatic self operating elevators as compared to those in which an elevator operator was employed who knew or had knowledge of the individuals visiting respective floors of a building. With automatic elevators the public has free ingress and egress to many more offices than before. In addition, many thefts are the result of company personnel as well.

OBJECTIVES OF THE INVENTION

A particular object of the invention is to provide, in a manner hereinafter set forth, a new and novel means whereby it will not be possible for any person to easily remove portable equipment from a given location.

Another object of the present invention, is to provide in a manner as hereinafter set forth, a new and novel means for preventing the unauthorized removal of portable equipment from a given location unless a key is employed to operate a locking device associated therewith.

Another object of the present invention, is to provide a locking device capable of being suitably secured to a standard desk containing room for a typewriter with a minimal alteration to the desk and which locking device once secured can only be removed by an authorized individual having a key to unlock the lock associated with the locking device.

Another object of the present invention, is to provide in a manner as hereinafter set forth, a locking device for preventing the theft of portable office equipment which is readily applicable to office furniture such as desks, in a manner that the locking device would not be visible to even one using the portable equipment.

Another object of the invention is the provision of a locking device of the character that can be secured to various types and sizes of portable equipment and office furniture to prevent the unauthorized removal of the equipment.

Another object of the present invention, is to provide in a manner as hereinafter set forth, a display cabinet on which a number of cameras may be locked in place in a simple but efficient manner.

SUMMARY OF THE INVENTION

The foregoing and other objects are obtained by providing, in accordance with one embodiment of the invention illustrated in FIGS. 1–3, housing means having a pair of spaced apart openings in the base thereof, adapted to be respectively secured by first fastener means, extending through one of said openings, to the support means of the portable equipment and by second fastener means, extending through the other opening, to the portable equipment and extending through the support means. Guard means adapted to prevent access to and ease in releasing said fastener means is to prevent access to and ease in releasing said fastener means is provided in the form of a yoke which is formed in a U-shape to provide two spaced apart parallel arms and a cross connection therebetween. The yoke extends transversely in a horizontal plane through opposite pairs of slots or apertures in spaced apart legs of said housing. The arms of said yoke intersect the vertical axes of said fastener means, or sufficiently overlap them to prevent access to the heads of the fastener means without removing the U-shaped yoke from its position.

Locking means is provided to engage the arms of the yoke in its extended position through the housing and thereby retain the guard means in a substantially fixed position to prevent its removal without a key. In operation, if a proper party wishes to remove the locked-in-place equipment he unlocks the locking means, disengaging it from the guard means and said guard means is withdrawn from its position in the openings in said housing with the result that the fastening means are now free to be disengaged. One particular aspect of this invention is that the first fastening means does not require removal to replace a typewriter and therefore once the housing means is secured in place it does not have to be removed to change a typewriter.

Vibration damping means may also be provided so that any vibrations setup in the portable equipment and support means is not transmitted to the housing, guard and locking means respectively.

In accordance with another embodiment of the present invention, illustrated in FIGS. 4 and 5, the locking means is secured to the housing means with a portion of said locking means extending within the housing chamber and adapted to engage the guard means which is contained within the housing chamber and having a latch portion for engagement with the locking means. The heads of the fastener means are fully enclosed by said housing to prevent access thereto. When unlocked to a free position the guard means is substantially removed from the housing to permit access to the fastener means for removal of the portable equipment. This embodiment of the invention lends itself to be either applied to existing office furniture or built into the desk when initially manufactured.

In accordance with another embodiment of the invention, illustrated in FIGS. 6 and 7, the locking device is designed to be used generally with support means of sheet metal construction, and the locking device installed when the desk is manufactured to permit a construction of a compact nature in which the locking device is essentially hidden to any one seeing or using the desk.

In accordance with another embodiment of the present invention, illustrated in accordance with FIGS. 8 and 9, the housing means, which encloses a portion of the fastener means, has the guard means pivotally mounted to the housing means at one end thereof and the locking means at the opposite end thereof.

In accordance with another embodiment of the present invention, illustrated in accordance with FIGS. 10–13, a cabinet is provided for simultaneously displaying a number of portable pieces of equipment, such as cameras, such that they may be viewed but locked in place.

BRIEF DESCRIPTION OF THE DRAWINGS

The invention possesses other objects and features of advantage, some of which, with the foregoing, will be set forth in the following description of the preferred embodiments of the invention. It is to be understood, however, that variations in the showing made by the said drawings and description may be adopted within the scope of the invention as set forth in the claims and which is illustrated in the drawings accompanying and forming part of the specification, in which:

FIG. 1 is a front elevational view, partly in section, of a locking device in accordance with the invention;

FIG. 2 is a side elevational view, partly in section, of the locking device showing the relationship between the various component parts thereof;

FIG. 3 is a partial view taken along line 3—3 of FIG. 2;

FIG. 4 is a view similar to FIG. 1 illustrating another embodiment of the invention in which the locking means is secured to the housing means;

FIG. 5 is a side view of the locking device of FIG. 4;

FIG. 6 is a view similar to FIG. 1 illustrating another embodiment of the invention which is primarily designed to be contained within the support means;

FIG. 7 is a side view of the locking device of FIG. 6;

FIGS. 8 and 9, illustrate another embodiment of the invention;

FIG. 10 is a perspective view of a display cabinet constructed in accordance with another embodiment of the present invention;

FIG. 11 is a perspective view showing the rear of the cabinet illustrated in FIG. 8;

FIG. 12 is a partial sectional view showing the locking arrangement for the displayed portable equipment; and FIG. 13 is a view along line 13—13 of FIG. 12.

DISCUSSION OF THE DRAWINGS

Similar reference characters refer to similar elements throughout the several views of the drawings.

FIGS. 1 through 3 illustrate a typical piece of portable office equipment 10, which may be in the form of a typewriter or any other found generally in an office. The type or style of typewriter here illustratetd is that wherein a plurality of feet 11 extend from the bottom 12 thereof, and which rest on support means 20 which may be an extension of a desk 21 or any other flat surface such as the top of a table, generally found in an office. The typewriter generally has a peripheral skirt 13 which leaves a minimal spacing between the upper surface 22 of the support means 20 and said skirt. The typewriter also has fastener securing means 15 in the base thereof, such as in the form of a threaded hole, and adapted to receive fastener means which are generally used to secure the typewriter in fixed position either during shipment or to prevent movement due to vibration when the unit is installed. All of the above described typewriter and associated support means is conventional and has been included merely to provide a background for explaining the construction and operation of this invention.

Referring first to FIGS. 1, 2 and 3, illustrating one embodiment of the present invention, it is seen that the locking device 30, shown in assembled relation to the typewriter unit 10 and the support means 20, is comprised of housing means 31, mounted against the lower surface 25 of the support means, which may be formed of a suitable metal or plastic material, having a base 32 and a pair of integrally formed spaced apart legs 33 and 34, extending at substantially right angles to said base, with a cover plate 35 extending parallel to said base and preferably integrally formed with said spaced apart legs 33 and 34. The base further includes a pair of spaced apart openings 36 and 37 extending therethrough.

The cover plate 35 is provided with a centrally located slot 38 which permits access to the chamber 40 of the housing means 31 and the fastener means 45, consisting of first fastening means 46, and second fastener means 47 both partially contained therein and extending through the openings in the base.

The first fastener means 46 secures the housing 31 to the support 20 and may consist of a threaded bolt with its head 48 extending in the chamber 40, and its shank 49 extending through the clearance opening 37 in the base 32 and through an aperture 23 drilled in the support 20, with a lockwasher 50 provided beneath the nut 51 and which when tightened will firmly retain the housing means 31 in fixed position.

The second fastener means 47 secures the typewriter 10 to the housing means 31 and may consist of a threaded bolt with its head 53 within the chamber 40 and its shank 54 extending through support opening 36 in the base and through an aperture 24 drilled in the support 20 and then into the fastener securing means 15 which is illustrated as a threaded coupling engaging the threaded shank 54.

The clearance apertures in the support means 20 may be obtained during installation of the locking device 30 by drilling through the support means to provide openings in alignment with those in the base 32.

A portion of the fastener means is contained within the housing chamber 40 and guard means 55 is provided for a horizontal movement from a first position as seen in FIG. 3 to prevent access to bolt heads 48 and 53 to a second position in which access is available to said fastener means. The guard means 55 in the form of a yoke 56 is shown as comprising a single piece of metal, or other suitable material, which is formed in a U-shape to provide two spaced parallel arms 57 and a cross connection 58 therebetween. The spacing between the arms is substantially equal with the spacings between the pairs of openings 41 and 42 in legs 33 and 34 respectively, which are in transversely aligned relationship with respect to each other, such as to snugly receive the arms 57, which are inserted therethrough to extend across the width of the housing 31, as shown, with the free end of the arms extending beyond the leg 34.

The yoke arms 57 are of a length materially greater than the distance between the legs 33 and 34 so as to extend beyond the leg 33 for receiving the locking means 60. Additionally, the arms 57 of the yoke 56 substantially intersect the vertical axis of the fastener means 45, as seen best in FIG. 3, or sufficiently overlap them to prevent their removal without having to first remove the guard means 55 from its position. As seen in FIG. 2 the spacing between the yoke arms 57 is equal to a distance A which is substantially equal to the dimension between the respective locking bolts.

After the guard means 55 has been placed in position, as illustrated in FIGS. 2 and 3, by extending the arms 57 through the pairs of openings 41 and 42 in the legs 33 and 34, respectively, the locking means 60 is secured to the free end of the guard means and locked in place by means of lock 61. The lock 61 is employed to prevent the unauthorized removal of the guard means and in turn that of the typewriter.

The lock 61 here shown is one of any number of types which may be employed, and accordingly it is to be understood that in showing and describing this particular type or style, there is no intention to limit the invention in any respect as it will be readily obvious that the only requirement is of a lock having an element of suitable form to pass through both the arms 57 of the yoke 56.

The lock 61 here shown has openings or passages (not shown) to receive the arms 57 of the yoke 56 and a key slot 62 (FIG. 3) into which a key is inserted to remove the lock. This lock is of a common well known type, being used principally as a bicycle lock, and accordingly it is not believed that a more detailed description is required for an understanding of its use as a part of this invention.

Another type of locking means and guard means, which may be employed in accordance with the invention, is the common padlock where one arm or shank thereof may extend through apertures in both legs so that the guard means may have only a single arm extending through the housing and overlapping the fastener means to prevent its removal without removing the guard means in the manner explained above.

To be assured that the locking bolts are not removed it is important that the distance X between the heads 48 and 53 of the fastener means 46 and 47 respectively, and the arms 57 be less than the distance Y which is the depth the shank 54 of the second fastener means 47 extends within the typewriter 10 and respectively the distance X be less than the distance Z, which is the distance the shank 49 extends beyond the upper surface 22 of the support means 20.

Although one housing is illustrated it is appreciated that a pair of locking devices may be used to prevent the typewriter itself from being rotated and removed even though the locking device is in place. This is generally not necessary if there is a difference in height between the upper surface 22 of the support means and the top of the desk, or the typewriter has a skirt 13. As seen in FIG. 1, if the distance B is less than the distance between the threaded shank 54 in the base of the typewriter and the greatest distance to the edge of the typewriter then the typewriter cannot be rotated and removed.

With the locking device 30 applied to the support means 20 and portable equipment 10 in the manner thus far described it will be seen that the arms 57 prevent access to the fastener means 45 and the locking means 60 prevents the removal of the guard means 55 from the housing means 31. As further seen the only alteration necessary to the support means is the drilling of the clearance apertures 23 and 24, to accommodate the fastener means 46 and 47 respectively. These minor alterations are covered by the typewriter and are therefore hidden.

The locking device 30 is generally set back from the edge of the support means and is hardly if at all visible. Thus, this embodiment of the present invention discloses an easily attachable device to existing equipment is a simple efficient manner and which device generally made of metal acts to prevent the theft of various office equipment.

As an additional feature, vibration damping means 65 may be provided so that any vibrations setup in the portable equipment and transmitted through the support means 20 does not cause any excessive noise between the locking means 60 and the guard means 55. A coil spring 66 may be placed on each arm 57 between the leg 34 and the lock 61 and which springs apply a constant force of predetermined magnitude to maintain the guard means, housing means and locking means relatively fixed with respect to each other.

In accordance with another embodiment of the present invention illustrated in FIGS. 4 and 5, it will be seen that the locking device 30a there illustrated is generally similar to the previously described locking device and differs substantially from the latter primarily with respect to the means provided for securing the guard means 55a to the locking means 60a. In this embodiment the guard means is reciprocally mounted and locking means are substantially contained within the housing means 31a when the locking device 30a is in its locked position. This embodiment of the invention also embodies four essential parts, comprising a housing means 31a, fastener means 45a, guard means 55a, and locking means 60a, though a fifth part in the form of vibration damping means 65a, may also be used in association with the essential four elements.

A housing 31a, is here shown as comprising a single piece of metal, plastic or other suitable material, which is formed having a base 32a, a pair of spaced apart legs 33a and 34a, respectively, and a cover plate 35a in spaced parallel relationship to the base 32a of the housing 31a, whereby a chamber 40a is formed to accommodate the guard means 55a and locking means 60a therein. Fastener means 45a consisting of first fastener means 46a in the form of a threaded bolt extends through the opening 37a in the base and clearance aperture 23a in the support means 20a and secures the housing means 31a with the use of washer 50a and nut 51a to said support means. Second fastener means 47a comprising a threaded bolt extending through the opening 38a and the clearance aperture 24a in the support means and engages the fastener securing means 15a in the typewriter 10a so that it is locked in place.

As previously explained the skirt of the typewriter is generally of sufficient height to engage the first fastener means if an attempt is made to remove the typewriter by rotating it counterclockwise to release it from the second fastener means. In other instances, the support means is below an abutting area of the desk (as illustrated in FIG. 1) which also prevents its rotation. For those installations where neither of the above two conditions exist stop means 70 may be provided to prevent the rotation and in turn removal of the typewriter. This is accomplished by providing a portion of the housing, for example the base, with an extended tab 71 which is beyond the edge of the support means. As seen in FIG. 5 a vertically extending pin 72 supported by said tab 71 is provided which has a length above the base of the typewriter so as to prevent the rotation of the typewriter without engaging said pin.

A slot 38a is provided in the cover 35a of the housing which is of sufficient width and length to permit the use of a screw driver or wrench for the proper installation of the fastener means hereinabove described.

Guard means 55a adapted to be substantially contained within the housing chamber 40a, is comprised of a body portion 73 having a forwardly tapered front portion 74 terminating in a hooked portion 75. At the opposite end of said body portion is a vertically extending rib 76 which is generally designed to be seated within the housing chamber 40a when the guard means 55a is in its first or locked position. A handle 77 is provided on the rear face 78 of the slide means to permit its easy withdrawal from within the housing when the locking means 60a is unlocked to the second position. An advantage for providing the hooked portion facing the cover 35a of the housing is that the top 79 of the body portion 73 remains flat and if either of the first or second fastener means should work its way loose there is no possibility of it jamming the reciprocally mounted guard.

Locking means 60a in the form of a lock 61a of any conventional type may be secured with the forward end of the housing 31a with a key slot 62a (FIG. 4) to receive a key that when rotated would vertically pivot the latch arm 80, as seen in FIG. 5, which engages the hooked portion 75 of the guard body portion 73 when the body is in its first or forward position, and interlock in a conventional manner to prevent the removal of the guard means 55a from within the housing unless a key is used.

Thus, from the description given and with reference to the drawings, it can be seen that the guard means 55a, once the housing has been placed in a locked position need merely be reciprocated in the direction of double headed arrow 81 after being unlocked to gain access to the fastener means through the slot 38a. As seen with respect of FIG. 5 unless one has a key to unlock the locking means 60a it is impossible to gain entrance to the first fastener means 46a and second fastener means 47a.

When a typewriter is generally used, or other portable equipment, the force applied by the operator or the inherent vibrations, if the equipment is electrically powered, may cause vibrations that would be transmitted to the guard means 55a which might prove to be objectionable. Thus, although the rib 76 may be in close engagement with the housing chamber wall and although the related locking portions may tightly grip each other it has been found advisable for certain designs to employ vibration damping means 65a. As seen in FIG. 5 pads 82, made of a vibration absorbent material such as rubber or plastic are secured to the base 32a in any conventional manner not shown, to engage the upper surface 79 of the guard means to damp out any vibrations due to the looseness between the mating surfaces.

Similarly, as discussed with respect to FIGS. 1 through 3, the dimension X is less than the dimension Y and the dimension Z. This is important in that even if the bolts of the fastener means 45a should work their way slightly loose due to vibrations they will still be able to prevent the unauthorized removal of the typewriter.

Referring now to FIGS. 6 and 7, there has been shown another embodiment of the present invention in which the locking device 30b may be constructed for use with desks in which the entire locking device may be built in and essentially hidden from view. The support means 20b of many desks or tables are of a sheet metal construction having an enclosed wall therearound. As seen in FIGS. 6 and 7 the support means 20b has a top or horizontal surface 84 with a vertical wall 85 extending around it. The height of the wall may be about one or two inches which is more than sufficient to permit the locking device 30b to be fully contained therein.

The housing means 31b may be of a sheet metal construction, and as seen in FIG. 6 is comprised of a housing similar to that shown in FIGS. 4 and 5 except that ears 87, extending from the vertical legs 33b and 34b, are provided to permit the first fastener means 46b to secure the housing to the support means 20b as by welding the ears 87 to the surface of the support means.

The guard means 55b may be similar to that illustrated above for reciprocation in a horizontal plane with a handle 77b at one end thereof to facilitate the ease of movement from a first to second position. The locking means 60b consisting of lock 61b is secured to the cover 35b of the housing in any conventional manner, and is of the commercial type such that the key must be inserted from beneath the support means 20b in a vertical directional since the wall 85 acts as an enclosure. In this manner the key slot 62b is not at all visible to someone sitting at the desk or anyone else in the office.

Vibration damping means 65b may also similarly be employed and secured to the housing side walls to take up for the possible loose spacing between the housing 31b and the guard means 55b.

In this embodiment of the invention the first fastener means 46b is attained by securing the housing, as by welding, to the support means 20b, and the second fastener means 47b may be attained by using a bolt extending through the support top 84 which acts as part of the housing, and within the typewriter 10b.

Although it has been illustrated in these embodiments that one locking device is used to secure a piece of portable equipment in place it should be understood that two locking devices may be used for double security. This is especially so in those instances where there is no skirt on the equipment or an abutting edge on the desk and it is not desirable to use the stop means as illustrated in FIG. 5.

Referring now to FIGS. 8 and 9, there has been shown another embodiment of the present invention in which the locking device 30c may be used in a manner hereinabove explained and which comprises a housing means 31c, a guard means 55c pivotally connected to said housing means at one end thereof, with the locking means 60c securing them together.

The fastener means 45c extends through the base 32c of the housing means 31c to secure the latter to the support means 20c. The housing chamber 40c is formed by the base 32c and vertically extending walls 89 integrally formed with said base and having an ear 90 extending from one of said walls with an aperture 91 extending therethrough (FIG. 8).

The guard means 55c is in the form of a cover 92 having a shoulder 93 with a clearance aperture 94 therein and which is in alignment with aperture 91 when the cover 92 is in the position as seen in FIG. 8. A hinge 95 connects the wall 89 to the cover 92 so as to permit pivotal movement from the first position of the guard means 55c as shown in FIG. 8 to a second position after the locking means 60c in the form of a lock 61c has its yoke removed from the apertures 91 and 94. In the first position the guard means 55c is in overlapping relation to the fastener means 45c to prevent access thereto, and in the second position the guard means is pivoted by hinge 95 to an open position with respect to the fastener means for removal of the portable equipment.

In accordance with another embodiment of the present invention illustrated in FIGS. 9–13, we have a display cabinet 100 for use in conjunction with portable equipment or devices 10, such as cameras, that are to be locked in place and yet viewed in an establishment by potential customers without the assistance of a salesman and fear of possible theft thereof.

The display cabinet 100 consisting of substantially a rectangular frame means 101 having a bottom 102 provided with bolting means 103 to secure it to the floor against theft and legs 104 on the bottom 102 thereof to raise the frame a sufficient distance from the floor to allow room for the bolting means. The frame 101 further consists of a front wall 105, a pair of side walls 106 and a rear wall 107 to form a chamber. The rear wall extends partially above the support means 108 and has a front surface 109 which forms part of the guard means 110 in the form of a backstop. Support means 108 which forms the top of the cabinet 100 acts as a camera platform and has a mat 111 made from felt or other material thereon to prevent the cameras from being scratched as they are secured in place. The mat 111 rests on the support member 112 which is secured to the frame 101.

As seen in FIGS. 11 and 12 the guard means 110 is comprised of a plurality of spaced apart stop pins 113 threaded at opposite ends 114 and 115 respectively with an enlarged collar 116 therebetween. In practice a stop pin 113 in first engaged into the fastener receiving means of the camera 10 (not shown) and then the lower threaded portion 115 is inserted through the aperture (not shown) in the support means 110 and the fastener 117, which may be in the form of a thumb screw, is tightened thereon and the camera is securely held in place. The distance between the fastener pins 113 and/or the backstop 109 is equal to a distance B and as seen in FIG. 13 this distance is less than the distance from the location of the pin 113 in the camera 10 to its furthest point which is equal to distance R. Since the spacing is selected that the distance B is less than R the guard means is properly spaced and the camera will not be removable until the thumb screw is removed and this is only possible if the rear door of the cabinet 118 is opened.

The guard means 110 is provided to permit a number of cameras 10 to be individually displayed on the support means 108 without the necessity of having a salesman continuously watch each customer. It is important that the customer be given an opportunity to physically examine the camera. In a glass showcase this is impractical and requires the attention of a salesman due to theft. If a customer after examining all of the cameras on the support means, desires to further examine the camera then the salesman can open the back of the display cabinet 100 which as seen in FIG. 11 is provided with the hinged door 118 which secured in a conventional way, as by locking means 120, in the form of a lock, that is normally locked to prevent access to the cabinet. The salesman having a key opens the door and releases the thumb screw 117, thus releasing the fastener pin 113 and permitting the camera to be examined by the potential customer. The camera may be returned by essentially following the same procedure in reverse.

In this manner it is possible to visually display a number of cameras in reach of the public and at the same time to be assured that they may not be readily removed.

The typewriter 10 here shown is one of any number of types of portable equipment that may be employed, and accordingly it is to be understood that in showing and describing this particular type or style, there is no intention to limit the invention in any respect as it will be readily obvious that the only requirement is that fastener receiving means be provided.

It will be seen from the foregoing description and illustrations that there is provided by the present invention a locking device which is of relatively simple construction and may be economically produced and inexpensively marketed and which will very effectively protect and prevent theft of portable equipment. The protective device can be easily and quickly placed in position for use and removed without in any way altering the form or construction of the portable equipment support.

It is to be understood that the above disclosure and drawings are directed to preferred embodiments of the invention and that other embodiments which fall within the scope of the appended claims will occur to those skilled in the art, and such other embodiments are intended to be covered by the claims.

I claim:

1. A display cabinet for securing in place portable equipment provided with fastener receiving means, comprising:
 (a) frame means having a chamber contained therein,
 (b) support means mounted substantially horizontally on said frame means, and
 (c) guard means extending substantially vertically from said support means, said guard means including a plurality of spaced apart members for engaging the fastener receiving means in said portable equipment, said spacing between said members being such that complete rotation of the equipment will be prevented due to the engagement of said portable equipment with an adjacent member.

2. A display cabinet as in claim 1;
 (a) wherein said frame means includes a bottom, a pair of sidewalls, and front and rear walls which form said chamber,
 (b) further including a door mounted on one of said walls to permit access to said chamber,
 (c) further including locking means associated with said door to prevent unauthorized entry into said chamber, and
 (d) said guard means partially extending through said support means into said chamber and accessible for removal thereof only through said door upon the release of said locking means to permit the disengagement of said guard means for the removal of said portable equipment from said cabinet.

3. A display cabinet as in claim 2, further including:
 (a) legs extending from said frame bottom, and
 (b) bolt means secured to said frame bottom and adapted to be secured to the surface on which the cabinet rests.

4. A display cabinet as in claim 2, further including a mat positioned on said support means to permit the securement of said portable equipment to the guard means without scratching the underside thereof.

5. A display cabinet as in claim 2, wherein said members include a threaded portion adapted to engage a threaded hole in the portable equipment.

6. A display cabinet for securing in place portable equipment provided with fastener receiving means, comprising:
 (a) frame means including a bottom, a pair of sidewalls, front and rear walls joined together to form a chamber,
 (b) a door mounted on one of said walls to permit access to said chamber,
 (c) locking means associated with said door to prevent unauthorized entry into said chamber,
 (d) support means mounted substantially horizontally on said frame means, and
 (e) guard means extending substantially vertically from said support means, said guard means including a plurality of spaced apart members for engaging the fastener receiving means in said portable equipment, said spacing between said members being such that complete rotation of the equipment will be prevented due to the engagement of said portable equipment with an adjacent member, and
 (f) said guard means partially extending through said support means into said chamber and accessible for removal thereof only through said door upon the release of said locking means to permit the disengagement of said guard means for the removal of said portable equipment from said cabinet.

7. A locking device for securing in place portable equipment provided with fastener receiving means, to support means comprising:
 (a) housing means having a chamber with an opening contained therein, and including a base portion and a plurality of sidewalls with the opening in opposing spaced relation to said base portion,
 (b) fastener means extending through said base portion for securing said housing means, support means, and portable equipment together, said fastener means extending partially within said housing chamber and accessible thereto,
 (c) guard means mounted for relative movement across said opening from a first position in overlapping relationship to said fastener means contained within said housing chamber to prevent removal of said fastener means through said opening, to a second position permitting access to said fastener means, and removal through said opening, and
 (d) locking means engageable with said guard means to prevent the latter's removal from its first to second position without the use of a key.

8. A locking device as in claim 7, wherein said guard means extends across said opening and is pivotally mounted for relative movement between said first and second positions respectively.

9. A locking device as in claim 8, wherein said guard means is pivotally mounted by means of a hinge secured to said housing means.

10. A locking device as in claim 8, wherein said locking means includes a lock securing said guard means to said housing means exteriorly of the latter.

11. A locking device as in claim 10, wherein:
 (a) said housing means includes four walls extending from said base portion, and joined together to form said housing chamber, (b) one of said walls having an ear portion extending beyond the guard means in its first position, with an aperture extending therethrough, and said guard means pivotally mounted to one of said walls and extending across the housing chamber when in its first position, including a cover portion and a downwardly extending shoulder portion including an aperture extending therethrough, with said respective apertures being in alignment with each other in the first position, such that the lock may extend through said apertures.

References Cited
UNITED STATES PATENTS

| | | | |
|---|---|---|---|
| 3,357,762 | 12/1967 | Forsyth | 312—215 |
| 3,410,122 | 11/1968 | Moses | 70—58 |
| 3,434,312 | 3/1969 | Buchman | 70—58 |

CASMIR A. NUMBERG, Primary Examiner

U.S. Cl. X.R.

70—58; 312—204